April 14, 1925.

C. H. AYARS 1,533,536

CAN FILLING MACHINE

Original Filed May 18, 1920    8 Sheets-Sheet 1

Witnesses:
R. P. Moore.
B. J. Richards

Inventor:
Charles H. Ayars.
By Joshua R. H. Potts
His Attorney.

April 14, 1925.

C. H. AYARS

CAN FILLING MACHINE

Original Filed May 18, 1920      8 Sheets-Sheet 2

1,533,536

Witnesses:
R. T. Moore.
B. Y. Richards

Inventor:
Charles H. Ayars.
By Joshua R. H. Potts
His Attorney.

April 14, 1925.

C. H. AYARS 1,533,536

CAN FILLING MACHINE

Original Filed May 18, 1920    8 Sheets-Sheet 3

Witnesses:
R. T. Moore.
B. J. Richards

Inventor:
Charles H. Ayars.
By Joshua R. H. Potts
His Attorney.

April 14, 1925.

C. H. AYARS 1,533,536

CAN FILLING MACHINE

Original Filed May 18, 1920   8 Sheets-Sheet 4

Witnesses:
R. T. Moore.
B. G. Richards

Inventor:
Charles H. Ayars.
By Joshua A. H. Topps
His Attorney.

April 14, 1925.  
C. H. AYARS  
1,533,536  
CAN FILLING MACHINE  
Original Filed May 18, 1920  8 Sheets-Sheet 5

Witnesses:  
R. T. Moore.  
B. G. Richards

Inventor:  
Charles H. Ayars.  
By Joshua R. H. Potts  
His Attorney.

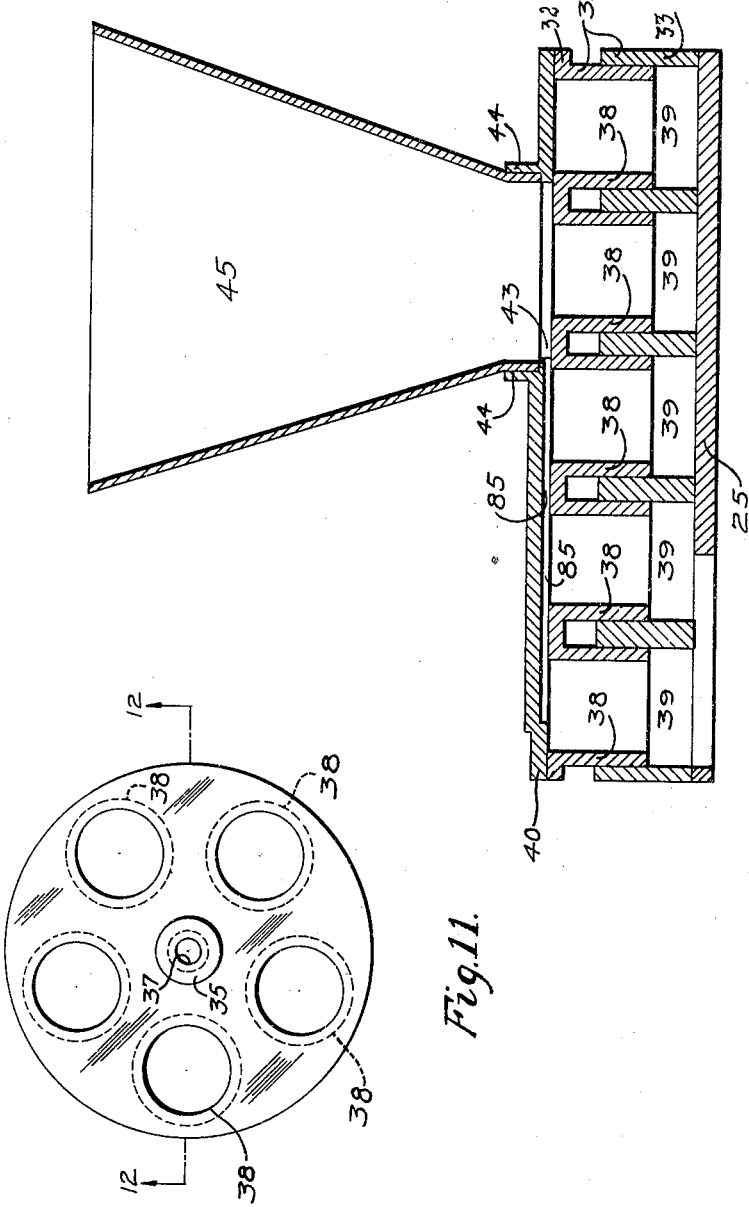
April 14, 1925.
C. H. AYARS
1,533,536
CAN FILLING MACHINE
Original Filed May 18, 1920   8 Sheets-Sheet 6
Witnesses:
R. T. Moore.
B. J. Richards
Inventor:
Charles H. Ayars.
By Joshua R. H. Potts
His Attorney.

April 14, 1925.

C. H. AYARS

CAN FILLING MACHINE 1,533,536

Original Filed May 18, 1920    8 Sheets-Sheet 7

Witnesses:
R. P. Moore.
B. J. Richards.

Inventor:
Charles H. Ayars.
By Joshua R. H. Potts
His Attorney.

April 14, 1925.

C. H. AYARS 1,533,536

CAN FILLING MACHINE

Original Filed May 18, 1920    8 Sheets-Sheet 8

Witnesses:
R. J. Moore.
B. Y. Richards

Inventor:
Charles H. Ayars.
By Joshua R. H. Potts
His Attorney.

Patented Apr. 14, 1925.

1,533,536

UNITED STATES PATENT OFFICE.

CHARLES H. AYARS, OF SALEM, NEW JERSEY.

CAN-FILLING MACHINE.

Original application filed May 18, 1920, Serial No. 382,368. Divided and this application filed October 8, 1921. Serial No. 506,299.

*To all whom it may concern:*

Be it known that I, CHARLES H. AYARS, a citizen of the United States, and resident of the city of Salem, county of Salem, and State of New Jersey, have invented certain new and useful Improvements in Can-Filling Machines, of which the following is a specification.

My invention relates to improvements in can filling machines, the present application being a division of my prior application filed May 18, 1920, Serial No. 382,368.

One object of my invention is to provide a can filling machine of a durable and comparatively simple construction which can be run at a high rate of speed and which will be operative to accurately deliver predetermined quantities of vegetables or the like, such as peas, into cans and also to deliver a predetermined quantity of brine or liquor into said cans.

Another object is to so construct my improved machine that the means of delivery will be such as to cause practically no splashing of the liquor as it enters the cans and for this reason it is unnecessary to provide any sealing means between the tops of the cans and the guiding means for the articles and liquor.

Another object is to so construct the parts of my improved machine that there will be practically no waste of the liquor due to leakage.

A still further object is to provide means of simple construction and which can be easily and quickly operated to vary either the quantity of the articles or liquor desired to enter the cans.

Another object is to so arrange the parts that they can be easily put together, lubricated or attended to by an operator.

A still further object is to so construct and arrange the parts that they can be operated by the application of a comparatively small amount of power.

A further object is to provide means which will guard against injury to the articles so as to prevent crushing or disfiguring the articles during the operation of the parts.

These objects, and other advantageous ends which will be described hereinafter, I attain in the following manner, reference being had to the accompanying drawings in which, Figure 1 is a top plan view of a machine constructed in accordance with my present invention, Figure 2 is a sectional elevation taken on the line 2—2 of Figure 1, Figure 3 is a fragmentary elevation showing certain of the parts illustrated in Figure 2 and drawn on an enlarged scale, Figure 4 is a section taken on the line 4—4 of Figure 3, Figure 5 is a section taken on the line 5—5 of Figure 3, Figure 6 is a perspective view showing the under side of a top or hopper plate which forms a part of my invention, Figure 7 is a sectional view taken on the line 7—7 of Figure 3, Figure 8 is a section taken on the line 8—8 of Figure 3, Figure 9 is a section taken on the line 9—9 of Figure 2, Figure 10 is a sectional elevation developed in a plane taken on the line 10—10 of Figure 4, Figure 11 is a plan view of the top section of a measuring wheel which I preferably employ, Figure 12 is a section taken on the line 12—12 of Figure 11, Figure 13 is a side elevation of a distributing wheel which forms a part of my present invention, Figure 14 is an inverted plan view of Figure 13, Figure 15 is a top plan view of Figure 13.

Figure 1:
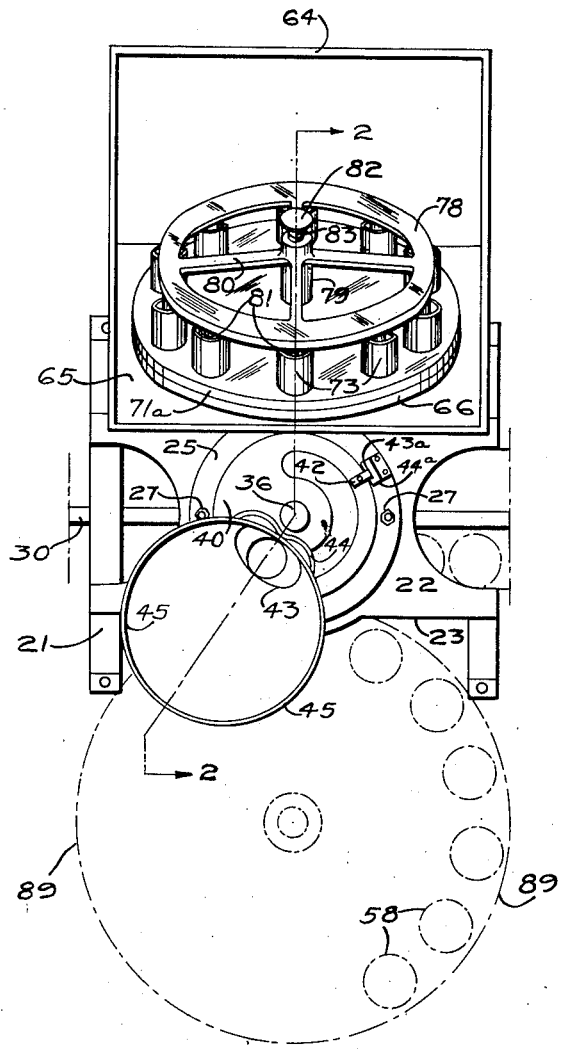
Figure 19:
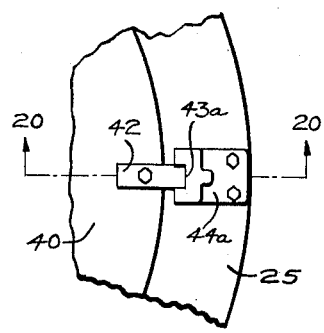
Figure 19 is a fragmentary top plan view of certain of the parts shown in Figure 1 and drawn on an enlarged scale.
Figure 20:
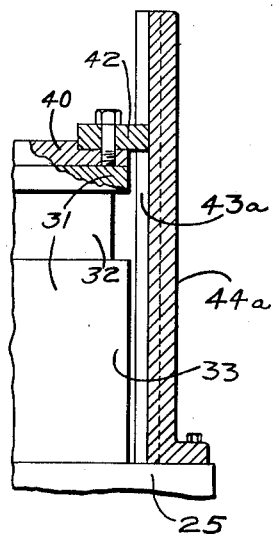
Figure 20 is a sectional elevation taken on the line 20—20 of Figure 19.

Referring to the drawings, 21 represents a frame or supporting structure which includes a top section 22 having a depending flange 23 and an aperture 23ª through which depends a flange 24 of a partition or bed plate 25. The bed plate is secured to the top section 22 in any suitable manner and as illustrated, bolts 27 are provided for this purpose. A vertical shaft 26 is rotatably mounted in a bearing 21ª secured to the frame 21; said shaft having a rotatable movement but preferably no vertical movement. The bottom of the shaft 26 has a bevel gear 28 thereon which meshes with a bevel gear 29 on a transversely extending drive shaft 30. The upper portion of the shaft 26 extends through a hole in the bed plate 25 as clearly shown in Figures 2 and 3.

A measuring wheel 31 is positioned above the bed plate 25 and includes a top section 32 and a bottom section 33. The bottom section 33 is keyed to the shaft 26 as shown at 34 and rotates upon the upper surface of the bed plate 25. The top section 32 has a central hollow boss 35 having its opening extending upwardly from the bottom and in which the top portion of the shaft 26 freely fits. An adjusting screw 36 fits a tapped opening 37 in the boss 35 and the lower end of the adjusting screw is adapted to engage the top end of the shaft 26. Thus the top section 32 of the measuring wheel is supported freely on the top of the shaft 26 and may be moved upwardly and downwardly by the turning of the adjusting screw 36 as is obvious from the showing in Figures 2 and 3. The top section 32 of the measuring wheel has a number of depending sleeves 38 which are open at their bottom; said openings extending to the top of the section 32 so that passageways are provided from the top to the bottom. In the present instance, the top section 32 is provided with five of these openings as clearly shown in Figures 10 and 11. The sleeves 38 are arranged annularly and slidably or telescopically fit within respective holes 39 in the bottom section 33 of the measuring wheel.

A top or hopper plate 40 has a central hole 41 through which the boss 35 extends so that the hopper plate 40 rests upon the top of the section 32 of the measuring wheel 31. It will be noted that in view of the fact that the shaft 26 is keyed to the bottom section 33 of the measuring wheel 31, the measuring wheel will be rotated by the shaft 26. In order to prevent the rotation of the hopper plate 40, said hopper plate has a lug 42 which extends into a vertical groove 43ª in a standard 44ª; said standard being secured to the partition or bed plate 25 as clearly shown in Figures 1, 3, 19 and 20. Thus the hopper plate 40 is free to move upwardly and downwardly due to the adjustment by means of the adjusting screw 36 but rotation of said hopper plate is prevented. The hopper plate 40 has a hole 43 which is surrounded by a flange 44; said hole extending entirely through the thickness of the hopper plate. A hopper 45 has its lower end fitted within the space provided by the flange 44 so that the lower open end of the hopper registers with the hole 43 and the articles to be inserted into the cans are dumped into the hopper 45 in the usual manner. In order to provide a clear and definite description it will be considered that the articles to be inserted into the cans are peas and that the liquor is also to be inserted into the same cans with the peas as is usually the custom.

A distributing wheel 46, as clearly shown in Figures 2, 3, 5, 13, 14, 15 and 16 is positioned below the bed plate 25 and has a central hole 47 through which the shaft 26 extends. A key 48 rotatably secures the distributing wheel 46 to the shaft 26 and a collar 49 is positioned under the distributing wheel and prevents movement of the distributing wheel in a vertical direction. The upper portion of the peripheral edge of the distributing wheel 46 is flanged at 50 so as to surround the lower part of the flange 24 as clearly shown in Figure 3. The formation of the distributing wheel 46 forms an important feature of my present invention and the same will now be specifically described.

Figure 15:
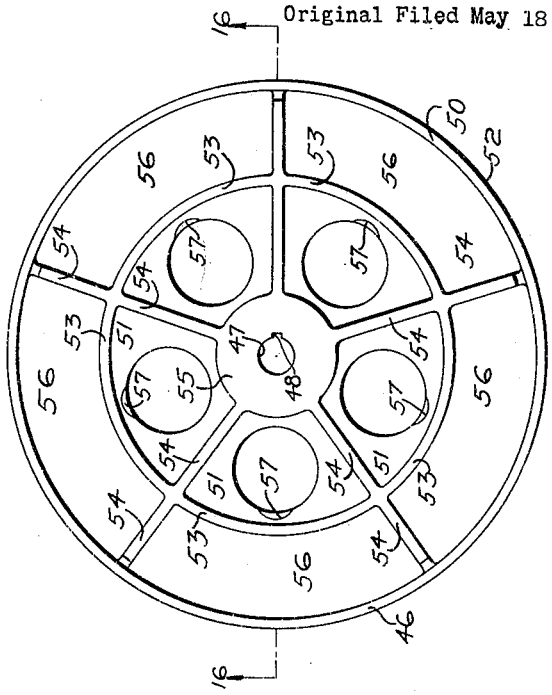
Figure 16:
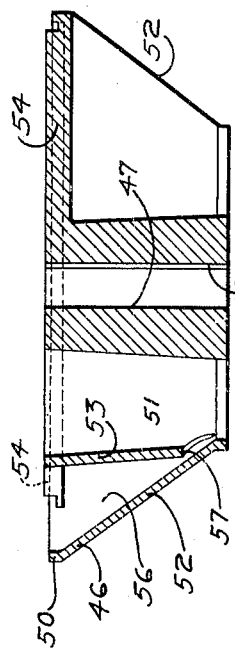
Figure 16 is a sectional elevation taken on the line 16—16 of Figure 15.
Figure 17:
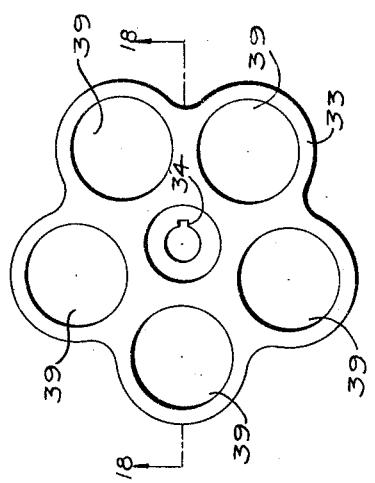
Figure 17 is a top plan view of the bottom section of said measuring wheel.
Figure 18:
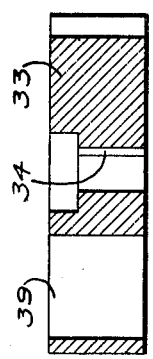
Figure 18 is a section taken on the line 18—18 of Figure 17.

A number of chutes 51 are arranged annularly and extend entirely through the distributing wheel 46 in respective alignment with the holes 39 of the lower section of the measuring wheel 31. The outer portion or shell 52 of the wheel 46 tapers downwardly and an annular partition 53 separates the chutes 51 from the shell 52. Radial partitions 54 separate the chutes 51 at their tops; the construction being such that the tops of the chutes 51 are in the form of sectors of a circle such as shown in Figure 15. These chutes 51 taper downwardly between the radial partitions 54, the annular partitions 53 and the central solid portion 55 of the wheel as clearly shown in Figures 15 and 16; said chutes 51 at their bottoms being substantially circular. The radial partitions 54 extend outwardly beyond the annular partition 53 and join the outer frusto-conical part 52 so as to provide pockets 56 which are respectively in radial alignment with the chutes 51. The chutes 56 also taper downwardly and at their bottoms communicate with the extreme lower portions of the chutes 51 through the medium of passages 57. These passages 57 are made extremely narrow for the purpose of slowly permitting liquor, which is discharged into the pockets 56, to run into the cans which are positioned below the bottoms of the chutes 51 as will hereinafter be more fully described. The cans 58 are fed by any suitable mechanism upon a disk 59 which is positioned below the bottom of the distributing wheel 46. This disk, in the present instance, is fixed and a wheel 60 is mounted above the disk and keyed to the shaft 26. The cans 58 are fed between the spokes 61 of the wheel 60 in positions directly under the respective lower portions of the apertures 51.

Figure 8:
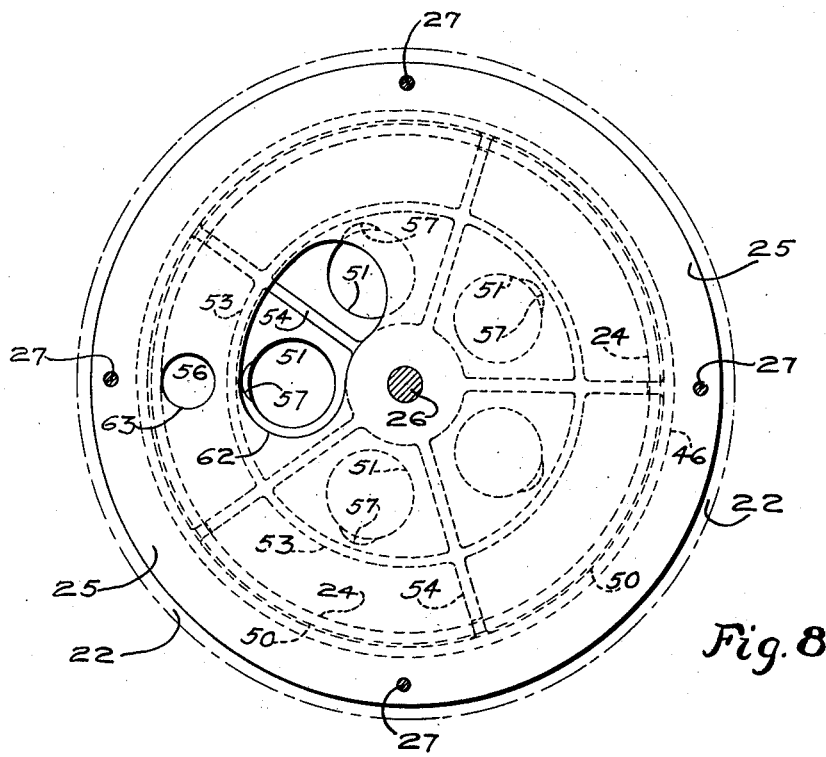
Figure 12:
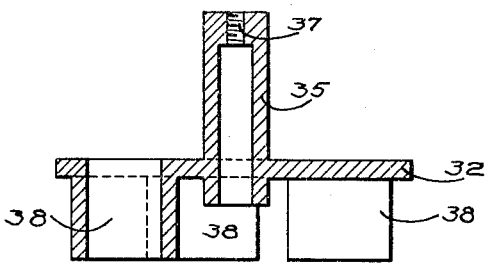
Figure 13:
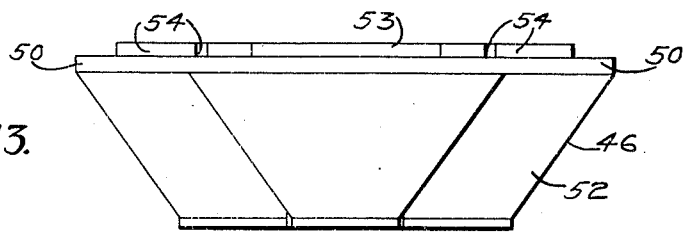
Figure 14:
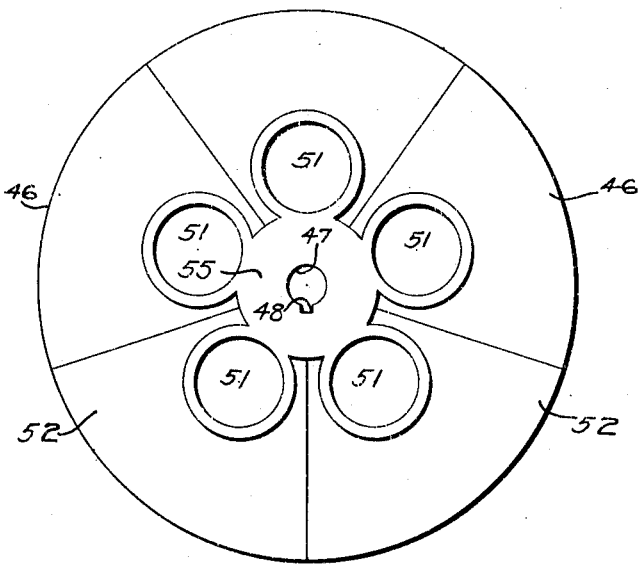

A discharge port 62 is formed entirely through the thickness of the bed plate 25 at a position remote from the opening 43 below the hopper and a hole 63 is also formed in said plate in radial alignment with a portion of the port 62. The port 62, as clearly shown in Figure 8, is of an elongated character taken in a direction concentric with the axis of the shaft 26; the length of said discharge port preferably being greater than the width of any one of the chutes 51 at its top for a purpose hereinafter described. The port 63 is preferably located opposite or nearly opposite the end of the elongated port 62 which is last reached in the normal rotation of the distributing wheel.

Figure 2:
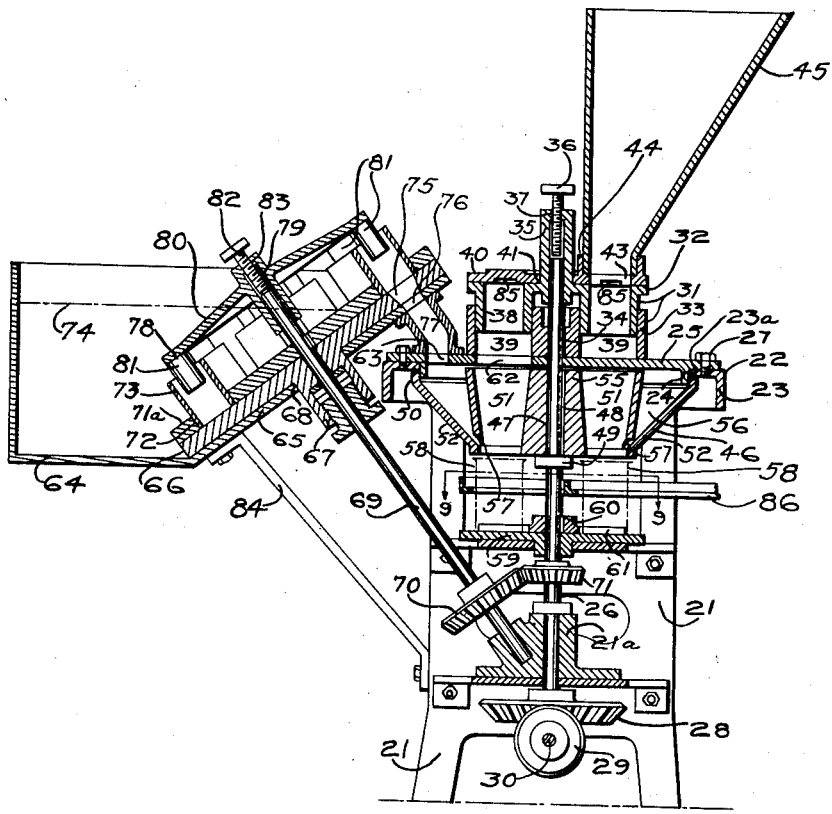
Figure 3:
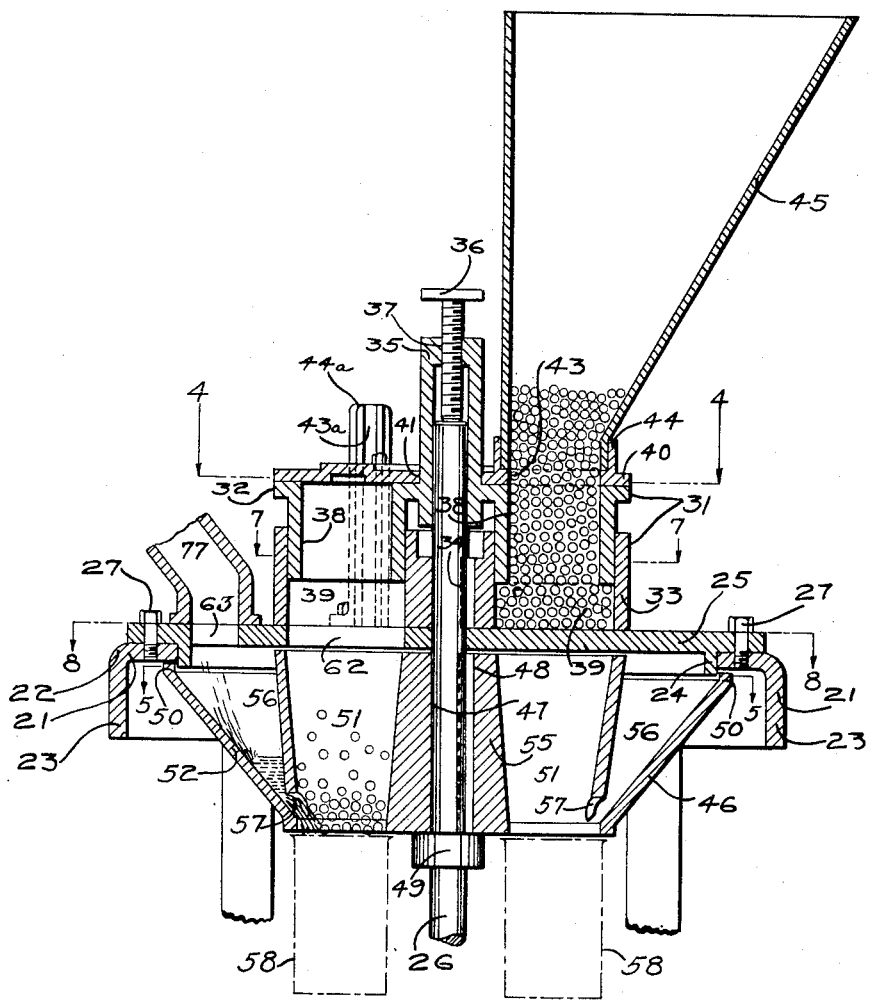

A liquid or liquor tank 64 has a part 65 of its bottom extending at an incline; the upper portion of the inclined part projecting above the bed plate 25 at one side of the measuring wheel 31 as clearly shown in Figures 1 and 2. A plate 66 within the tank is secured to the inclined part 65, to project above the level of liquor in said tank, and has a stuffing box 67 projecting out of an opening 68 in said inclined part 65. An inclined shaft 69 extends through said stuffing box into the tank and has a bevel gear 70 secured thereto which meshes with another bevel gear 71 on the shaft 26. The lower end of the shaft 69 is rotably supported in the bearing 21ª. The upper surface of the plate 66 is preferably ground or otherwise smoothly finished so as to be practically flat and a disk 71ª, which is keyed to the shaft 69, has its lower surface in rotatable contact with the fixed plate 66. The disk 71ª has a number of holes 72 cut entirely therethrough and in these holes are fitted tubes 73. The tubes 73 are open at their tops and bottoms and are arranged annularly and adapted during rotation to dip into the body of liquor within the tank 64 and become filled with the liquor at a position below the level 74 and then, during the rotation of the shaft 69 and disk 71ª, to move to a position above the level 74 of the liquor into register with a hole 75 in the plate 66 and a hole 76 in the bottom 64 of the tank. A pipe or nipple 77 connects the hole 76 of the tank 64 with the hole 63 of the bed plate 25; said latter hole being lower than the hole 76. Thus during the rotation of the shaft 69 and disk 71ª as each of the tubes 73 pass into register with the hole 75, the liquor within the tubes will flow downwardly through the pipe 77 and hole 63 into any of the pockets 56 which happens to be below the hole 63 so that the liquor will be discharged successively into the pockets 56 as the latter, during the rotation of the distributing wheel 46, pass below the hole 63. It will be noted that the measuring wheel 31, distributing wheel 46 and can actuating wheel 60 operate as a unit during the rotation of the shaft 26 and the shaft 69 is so geared to the shaft 26 that a measured quantity of liquor will be deposited in each of the pockets 56 as the latter pass under the hole 63.

As a means for varying the quantity of liquor entering the tubes, I provide the following mechanism: A ring 78, as clearly shown in Figures 1 and 2, is connected to a central hub 79 by arms or spokes 80. Displacement plugs 81 are secured to the ring 78 and depend into the upper ends of the tubes 73. The hub 79 is hollow and the upper end of the shaft 69 is slidably keyed within the lower end of the hub. An adjusting screw 82 fits a tapped hole 83 in the top of the hub and the inner end of this screw abuts the top of the shaft 69 as clearly shown in Figure 2. By turning the screw 82, the displacement plugs 81 can be moved into or out of the tubes 73 and by this means the capacity of the tubes can be varied to suit different requirements such for example as when it is desired to vary the amount of liquor to be put in the cans.

The tank 64 can be secured in any suitable manner to the frame 21 in addition to the connection formed by the pipe 77 and I have illustrated braces 84 which connect with the tank and frame as shown in Figure 2. The sides of the tank 64 are made sufficiently high that should any leakage occur between the uppermost portions of the disk 71ª and plate 66, the leaking liquor will flow downwardly back again into the tank. Therefore, even though irregularities occur by wear between the disk 71ª and plate 66, there will be no waste of material and if the operator finds that an insufficient amount of liquor is being supplied to the cans, due to leakage as above described, he can compensate very quickly for the amount of liquor lost by leakage by turning the adjusting screw 82 to withdraw the displacement plugs 81 part way out of the tubes 73; thereby giving the tubes 73 a greater initial capacity so that even though a part of the liquor returns to the tank by leakage there will still be sufficient liquor in the tubes and the cans will receive their proper allotment.

Figure 4:
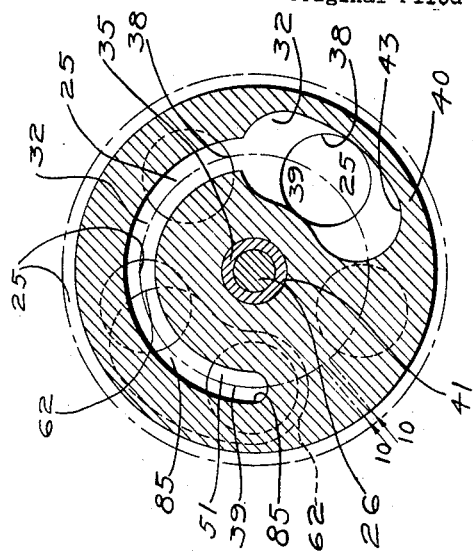
Figure 6:
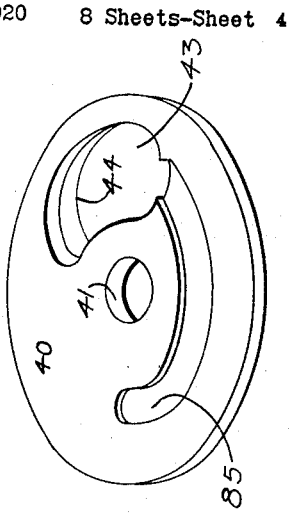
Figure 5:
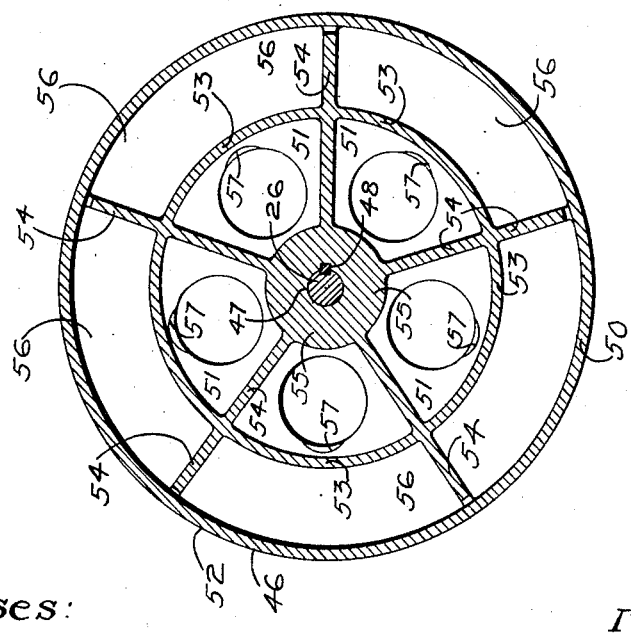
Figure 7:
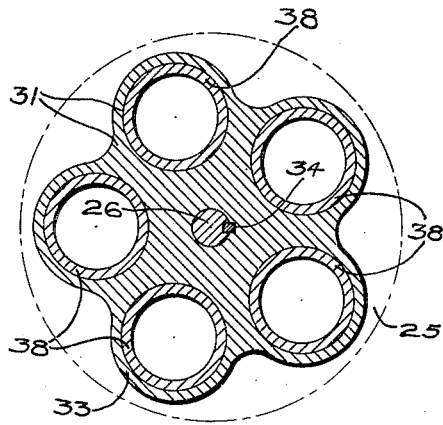

In order to guard against mashing or otherwise disfiguring the peas, due to the relative rotation between the hopper plate 40 and the top section of the measuring wheel, I form a curved groove 85 in the bottom surface of the hopper plate 40 as clearly shown in Figures 2, 4 and 6; said groove extending from the opening 43 to a position above the discharge port 62; the extent of the length of the groove 85 being clearly shown in Figure 4. It is obvious that the peas within the hopper 45 will drop into the spaces provided by the sleeves 38 and holes 39 of the measuring wheel as the sleeves successively pass under the opening 43. Thus the space provided by said sleeves and apertures will be filled with the peas and during the rotation of the shaft 26, any of the peas which are part way within the opening 43 and sleeves 38 instead of being mashed or cut will pass uninjured through the space provided by the groove 85 until the sleeves and corresponding openings reach the discharge port 62. The peas will then fall through the discharge port and the chute 51 in the distributing wheel which is immediately below the discharge port and after passing through the chute 51, the peas will fall into the can 58. Then a measured amount of the liquor will be discharged into the adjacent radial pocket 56 but owing to the small restricted passage 57 leading out of the pocket, the liquor will flow slowly into the can, without splashing, during the continued rotation of the elements which are connected to the shaft 26. By making the upper portions of the pockets 56 comparatively wide in their directions concentric to the axis of rotation, the liquor can be discharged into said pockets without fear of splashing or leakage and after the liquor has once been deposited in the pockets, it will continue to flow slowly into the can during the continued rotation of the elements and owing to this manner of discharging the liquor into the cans, I have found in actual practice that it is not necessary for any seal between the tops of the cans and the bottom of the distributing wheel. Further than this, the flow of liquor into the cans is so gradual that it will not disturb the peas in the cans to such an extent as to throw the peas out of the cans as often occurs in many can filling machines made prior to my present invention.

As shown in Figure 8, the arrangement of parts is such that a measured unit of granular material reaches the elongated port 62 before the corresponding measured unit of liquid reaches its port 63. Inasmuch as the discharge of the granular material is practically unrestricted and the liquid port is positioned adjacent that end of the elongated port 62 toward which the can is traveling, all, or substantially all of the granular unit will drop into the can before the liquid pocket begins to fill. Owing to the fact that the outlet from the liquid pocket is restricted the major portion of the liquid will be retained in the pocket until the can has passed the granular port and be discharged gradually as the travel of the can is continuous.

Figure 9:
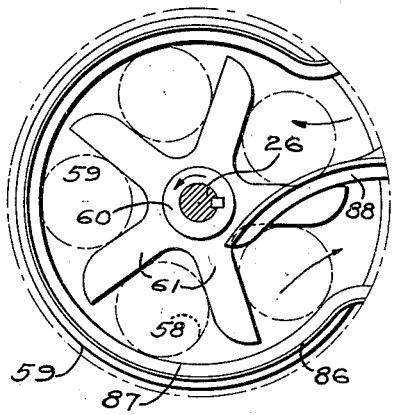

The capacity of the measuring spaces provided by the measuring wheel can be easily and quickly varied merely by turning the adjusting screw 36 to cause the sleeves 38 to move into or out of the holes 39. A guide rail 86 for the cans has an arcuate portion 87 which forms an inclosure for the cans and as shown in Figure 9, the cans may enter between the spokes of the wheel 60 in any suitable manner and are ejected or moved off the disk by means of the arms and a divisional rail 88. The cans after being moved off the disk may be deposited on any suitable conveying means such for example as the rotatable table 89 which is shown in dot-and-dash lines in Figure 1. Thus the cans are maintained in positions respectively under the chutes 51 and are slid upon the disk 59 by the spokes 61 of the wheel 60 and take a circular path concentric to the shaft 26 so as to be in a position to receive the peas and liquor in accordance with the above description.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A can filling machine including a member having a port for discharge of liquid; means for causing cans to travel under the port; means for segregating measured quantities of liquid, and traveling pockets adapted to receive the measured quantities of liquid, the pockets having elongated restricted openings whereby liquid is carried beyond the port and gradually discharged into the cans.

2. A can filling machine including a member having a port for discharge of liquid; a rotatable distributing wheel; pockets carried by the distributing wheel adapted to register with the liquid port and having elongated restricted openings whereby liquid is carried beyond the port and gradually discharged into the cans.

3. A can filling machine including a member having a port for discharge of granular material and a port for discharge of liquid; a rotatable distributing wheel having chutes adapted to register with the port for granular material and pockets adapted to register with the port for liquid material, the pockets having restricted openings whereby liquid is carried beyond the liquid port and gradually discharged into the cans.

4. A can filling machine including a member having a port for discharge of granular material and a port for discharge of liquid; means for causing cans to travel under the ports; means for segregating measured quantities of granular material and of liquid; traveling chutes adapted to receive the units of granular material and discharge them into the cans, and traveling pockets adapted to receive the liquid units, the pockets having restricted openings whereby liquid is carried beyond the liquid port and gradually discharged into the cans.

5. A can filling machine including a member having a port for discharge of granular material and a port for discharge of liquid; means for causing cans to travel under the ports; means for segregating measured quantities of granular material and of liquid; traveling chutes adapted to receive the units of granular material and discharge them into the cans, and traveling pockets adapted to receive the liquid units, the pockets having restricted openings whereby liquid is carried beyond the liquid port and gradually discharged into the cans, the ports being so positioned that in the normal travel of the chutes and pockets the chutes will reach the discharge port for granular material before the pockets reach the discharge port for liquids.

6. A can filling machine including a member having a port for discharge of granular material and a port for discharge of liquid; a rotatable distributing wheel having an annularly disposed series of chutes adapted to register with the first mentioned port and deliver granular material to the cans, and an annular series of pockets arranged outside the chutes and adapted to register with the liquid port, the pockets having restricted openings whereby liquid is carried beyond the liquid port and gradually discharged into the cans.

7. A can filling machine including a relatively fixed member having a port for discharge of granular material and a port for discharge of liquid; a distributing wheel located below the fixed member and having chutes arranged annularly of its axis adapted to direct granular material into the cans and annularly arranged pockets adapted to receive liquid and discharge it into the cans; means for rotating the distributing wheel to move the chutes and pockets successively under the ports in the fixed member; means for maintaining cans under the chutes, and means for delivering granular material into the chutes and liquid into the pockets as the cans pass thereunder, substantially as described.

8. A can filling machine including a relatively fixed member having a port for discharge of granular material and a port for discharge of liquid; a distributing wheel located below the fixed member and having chutes arranged annularly of the axis adapted to direct granular material into the cans and annularly arranged pockets adapted to receive liquid and discharge it into the cans; means for rotating the distributing wheel to move the chutes and pockets successively under the ports in the fixed member; means for maintaining cans under the chutes, and means for delivering granular material into the chutes and liquid into the pockets as the cans pass thereunder, the pockets having discharge outlets of a size which will restrict the discharge of the liquid thereby holding the major portion of the liquid temporarily in the pocket and cause the liquid to flow slowly into the cans as their movement continues, substantially as described.

9. A can filling machine including a relatively fixed member having a port for discharge of granular material and a port for discharge of liquid; a distributing wheel located below the fixed member and having chutes arranged annularly of its axis adapted to direct granular material into the cans and pockets, arranged annularly at a distance from the axis greater than that of the chutes, adapted to receive liquid and discharge it into the cans; means for rotating the distributing wheel to move the chutes and pockets successively under the ports in the fixed member; means for maintaining cans under the chutes, and means for delivering granular material into the chutes and liquid into the pockets as the cans pass thereunder; substantially as described.

10. A can filling machine including a relatively fixed member having a port for discharge of granular material and a port for discharge of liquid; a distributing wheel located below the fixed member and having chutes arranged annularly of its axis adapted to direct granular material into the cans and annularly arranged pockets adapted to receive liquid and discharge it into the cans; means for rotating the distributing wheel to move the chutes and pockets successively under the ports in the fixed member; means for maintaining cans under the chutes, and means for delivering granular material into the chutes and liquid into the pockets as the cans pass thereunder, the fixed member having a flange depending below the liquid port and the wheel having a flange embracing the flange on the fixed member.

11. In a can filling machine, a rotatable distributing wheel having an annular series of chutes adapted to direct granular material to the cans and an annular series of pockets adapted to receive liquid and discharge it into the cans; a bed plate disposed above the wheel and having a port for discharge of granular material and a port for discharge of liquid, the ports being so positioned that, in the normal rotation of the wheel, a chute for granular material will reach the granular port before the corresponding pocket reaches the liquid port whereby granular material will be first discharged into the cans, substantially as described.

12. In a cam filling machine, a rotatable distributing wheel having an annular series of chutes adapted to direct granular material to the cans and an annular series of pockets adapted to receive liquid and discharge it into the cans; a bed plate disposed above the wheel and having an elongated port for discharge of granular material and a port for discharge of liquid, the ports being so positioned that, in the normal rotation of the wheel, a chute for granular material will reach the granular port before the corresponding pocket reaches the liquid port whereby granular material will be first discharged into the cans, substantially as described.

13. A can filling machine including means for measuring quantities of granular and liquid material; means for successively moving the measured units into registry with discharge ports; a distributing wheel having an annular series of chutes adapted to direct a unit of granular material from its discharge port to the cans and an annular series of pockets adapted to receive a liquid unit and discharge it into the cans, and means for successively moving the cans into registry with the chutes, substantially as described.

14. A can filling machine including a hopper; a hopper plate; a bed plate having a discharge opening for granular material; a traveling measuring device, mounted between the bed plate and the hopper plate, adapted to receive material from the hopper and deliver it to the discharge port in the bed plate, the hopper plate having a groove in its under surface leading from the discharge opening of the hopper to said discharge port in the bed plate, substantially as described.

15. A can filling machine including a member having a discharge port; a drive shaft; a measuring wheel made in sections, said sections having telescoping portions providing measuring spaces, one of said sections being rotatably secured to said drive shaft; a hopper plate forming a closure for said spaces and having a groove communicating with the tops of said spaces; a hopper supported by said plate, and means for preventing rotation of said plate, substantially as described.

16. In a machine for filling cans, the combination of a rotary can-conveyor, a rotary device for measuring granular material, a hopper for delivering granular material to said measuring device, and means for preventing the crushing of the granular material comprising an extension on the mouth of the hopper leading in the direction in which the measuring device moves, and adapted to contain a shallow layer of the granular material and to discharge the same into the said measuring device after the latter has been cut off from communication with the hopper.

17. In a machine for filling cans, the combination of a traveling measuring device, a hopper arranged to deliver into said measuring device, and having a mouth adapted to register with said measuring device, the mouth of said hopper being formed to permit a layer of the material to be carried along past the mouth of the hopper, and means for raking said layer of material into the measuring device after the latter has passed the mouth of the hopper.

18. A machine for handling granular material comprising a receptacle having a discharge opening, a series of receivers moving underneath said discharge opening for receiving granular material from said receptacle, and supporting means extending between adjacent receivers and moving therewith, to keep the material from falling out of the receptacle between the receivers, said supporting means having a supporting surface spaced from the rear edge of said discharge opening, as it travels underneath it, a distance sufficient to permit a layer of granular material to travel along with said supporting means whereby said granular material will not be crushed when the receiver passes from underneath the discharge opening.

19. In a can filling machine, can conveying means; and a hopper having a discharge outlet into and out of registration with which the cans to be filled move, said discharge outlet being provided with a relatively shallow open bottom pocket extending the hopper outlet in the direction of movement of the cans and from which the final quantity of material is supplied from the hopper after the major quantity has been supplied through said discharge outlet.

20. In a can filling machine, a hopper, the discharge opening of which is provided with a lateral extension communicating therewith and supplied from the hopper and from which the final quantity of material for each can is delivered from the hopper.

21. In a can filling machine, a hopper, the discharge opening of which consists of a portion in the line of vertical pressure of the mass in the hopper and of a portion which is displaced from and out of line with such vertical pressure and by which the final quantity of material for each can is delivered from the hopper.

22. In a can filling machine, a hopper, the discharge opening of which consists of a main portion in the line of vertical pressure of the mass in the hopper and of an auxiliary portion which is displaced from and out of line with such vertical pressure, and of a capacity of substantially a single layer of the material being canned.

23. A can filling machine including a liquid tank; a fixed member in the bottom of the tank having a discharge opening; a shaft taking into the tank; a disk fixed to the shaft and rotatable on the fixed member; a series of tubes carried by the disk and opening therethrough; a ring splined upon the shaft and carrying a series of displacement members taking loosely into the tubes; means for adjusting the ring on the shaft to vary the capacity of the tubes, and means for rotating the shaft.

24. A can filling machine including a tank for liquid; an inclined member in the bottom of the tank extending above the liquid level and having a discharge opening above said level; a series of tubes in slidable engagement with the inclined member, and means for moving the tubes whereby they may be successively immersed in the liquid and brought into registry with the discharge opening.

25. A can filling machine including a tank for liquid; an inclined member in the bottom of the tank extending above the liquid level and having a discharge opening above said level; a disk carrying a series of tubes with their lower ends bearing on the inclined member, and means for rotating the disk whereby the tubes may be successively immersed in the liquid and brought into registry with the discharge opening.

26. A can filling machine including a tank for liquid; an inclined member in the bottom of the tank extending above the liquid level and having a discharge opening above said level; a shaft; a disk fixed to the shaft and carrying a series of tubes with their lower ends bearing on the inclined member; a ring splined to the shaft and carrying a series of displacement members taking loosely into the tubes; means for adjusting the ring to vary the capacity of the tubes, and means for rotating the shaft whereby the tubes may be successively immersed in the liquid and brought into registry with the discharge opening.

27. A can filling machine including a tank for liquid; an inclined member in the bottom of the tank extending above the liquid level and having a discharge opening above said level; a series of tubes in slidable engagement with the inclined member; means for moving the tubes whereby they may be successively immersed in the liquid and brought into registry with the discharge opening, and means for delivering the liquid to the cans.

28. A can filling machine including a fixed tank for liquid; an inclined member in the bottom of the tank having a discharge opening above the liquid level; a shaft taking into the tank; a disk fixed to the shaft and rotatable on the inclined member; a series of tubes carried by the disk and opening therethrough, and means for rotating the shaft whereby the tubes may be successively immersed in the liquid and brought into registry with the discharge opening.

In testimony whereof I have signed my name to this specification in the presence of two subscribing witnesses.

CHARLES H. AYARS.

Witnesses:
   ELIZABETH GARBE,
   CHAS. E. POTTS.